United States Patent
Kim et al.

(10) Patent No.: US 12,522,184 B2
(45) Date of Patent: Jan. 13, 2026

(54) STROKE SENSOR APPARATUS FOR BRAKE PEDAL AND ELECTRONIC BRAKE SYSTEM INCLUDING THEREOF

(71) Applicant: HL MANDO CORPORATION, Pyeongtaek-si (KR)

(72) Inventors: Yeonseong Kim, Pyeongtaek-si (KR); Byungki Kim, Pyeongtaek-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 18/746,666

(22) Filed: Jun. 18, 2024

(65) Prior Publication Data

US 2025/0001983 A1    Jan. 2, 2025

(30) Foreign Application Priority Data

Jun. 29, 2023 (KR) .................. 10-2023-0084476
May 17, 2024 (KR) .................. 10-2024-0064739

(51) Int. Cl.
*B60T 7/04* (2006.01)
*B60T 11/18* (2006.01)
*F15B 19/00* (2006.01)

(52) U.S. Cl.
CPC .............. *B60T 7/042* (2013.01); *B60T 11/18* (2013.01); *F15B 19/00* (2013.01); *B60T 2220/04* (2013.01)

(58) Field of Classification Search
CPC ............................ B60T 7/042; B60T 2220/04
See application file for complete search history.

(56) References Cited

U.S. PATENT DOCUMENTS

| | | | | |
|---|---|---|---|---|
| 2016/0144836 A1* | 5/2016 | Mayr | ............... | B60T 11/165 29/401.1 |
| 2017/0021813 A1* | 1/2017 | Tandler | ............ | B60T 8/368 |
| 2021/0129816 A1* | 5/2021 | Weh | ................ | B60T 7/042 |

FOREIGN PATENT DOCUMENTS

| | | | |
|---|---|---|---|
| KR | 10-2020-0127502 A | | 11/2020 |
| KR | 20200127502 A | * | 11/2020 |
| KR | 10-2021-0062945 A | | 6/2021 |
| KR | 20210062945 A | * | 6/2021 |

* cited by examiner

*Primary Examiner* — Thomas E Lazo
(74) *Attorney, Agent, or Firm* — Studebaker Brackett PLLC

(57) ABSTRACT

Disclosed are a stroke sensor apparatus for a brake pedal and an electronic brake system including thereof. The stroke sensor apparatus for a brake pedal and the electronic brake system including thereof according to the exemplary embodiments may be provided, which include: a hydraulic block; a rod assembly including a rod which moves linearly by operation of the brake pedal and having at least a part disposed in the hydraulic block; a magnet assembly including a magnet which moves with the same displacement as a displacement of the rod, and a magnet assembly path penetrating a central axis of the magnet, and disposed in the hydraulic block; and a sensor sensing a magnetic field change of the magnet, and generating an electrical signal corresponding to the displacement of the rod.

19 Claims, 11 Drawing Sheets

STROKE SENSOR APPARATUS FOR BRAKE PEDAL AND ELECTRONIC BRAKE SYSTEM INCLUDING THEREOF

CROSS-REFERENCE TO RELATED APPLICATIONS

This application claims the priority of Korean Patent Application Nos. 10-2023-0084476 and 10-2024-0064739 filed on Jun. 29, 2023 and May 17, 2024, in the Korean Intellectual Property Office, the disclosure of which is incorporated herein by reference.

BACKGROUND

Field

The present disclosure relates to a stroke sensor apparatus for a brake pedal and an electronic brake system including thereof, and more particularly, to a stroke sensor apparatus for a brake pedal and an electronic brake system including thereof, which can enhance durability and mountability, and at the same time, accurately and effectively measure a displacement and a stroke of a brake pedal.

Description of the Related Art

A vehicle is essentially equipped with a brake system for braking, and proposed are several types of systems to obtain more stable and effective braking power, depending on the more stable and various operating conditions of the vehicle.

In general, a brake system in related art supplies liquid pressure required for braking to a wheel cylinder through a booster mechanically connected to the brake pedal when the driver steps on the brake pedal. Recently, however, an electronic brake system has been a lot used, in which when the driver steps on the brake pedal, the pedal stroke sensor or the pedal travel sensor detects the movement of the brake pedal, and based on this, the driver's willingness to brake will be delivered as an electrical signal, and the liquid pressure required for braking is supplied to the wheel cylinder to precisely control the braking power.

Such an electronic brake system includes a master cylinder connected to the brake pedal and generating the liquid pressure by a pedal force of the brake pedal, a pedal stroke sensor sensing a displacement of the brake pedal, a liquid pressure supply device generating the liquid pressure of a pressing medium by operating a motor based on information sensed by the pedal stroke sensor, and a hydraulic control unit adjusting and supplying the liquid pressure generated by the liquid pressure supply device to a wheel cylinder.

Here, the pedal stroke sensor is installed in the master cylinder connected to the brake pedal and detects the displacement of the brake pedal through a magnetic field change generated from a magnet which moves with the same displacement as the displacement of the brake pedal, and has a problem in that an installation location should be individually adjusted according to a form and or a structure of the vehicle, or spatial efficiency of the vehicle is degraded due to an increase in size of a brake pedal assembly, and at the same time, it is difficult to mount and apply a product.

Further, the stroke sensor apparatus for the brake pedal in the related art with a magnet and a pedal stroke sensor has a problem in that the stroke sensor apparatus is tilted or deformed while a magnet assembly including the magnet movies with the same displacement as the displacement of the brake pedal, so the displacement or stroke of the brake pedal cannot be accurately measured.

SUMMARY

An object to be achieved by an exemplary embodiment is to provide a stroke sensor apparatus for a brake pedal and an electronic brake system including thereof, which have a simple structure and are easily assembled and installed.

Another object to be achieved by an exemplary embodiment is to provide a stroke sensor apparatus for a brake pedal and an electronic brake system including thereof, which can minimize a distance deviation between a magnet which moves linearly according to a displacement of a brake pedal, and a sensor sensing the magnet.

Yet another object to be achieved by an exemplary embodiment is to provide a stroke sensor apparatus for a brake pedal and an electronic brake system including thereof, which can prevent a magnet assembly including the magnet which moves linearly according to the displacement of the brake pedal from being deformed or tilted while moving.

According to an exemplary embodiment of the present disclosure, a stroke sensor apparatus for a brake pedal may be provided, which includes: a hydraulic block; a rod assembly including a rod which moves linearly by operation of the brake pedal and having at least a part disposed in the hydraulic block; a magnet assembly including a magnet which moves with the same displacement as a displacement of the rod; and a sensor sensing a magnetic field change of the magnet, and generating an electrical signal corresponding to the displacement of the rod, in which the magnet assembly includes a magnet assembly path penetrating a central axis of the magnet, and is disposed in the hydraulic block.

The hydraulic block may include a rod chamber into which a rear end of the rod assembly is inserted, and a magnet chamber provided to be adjacent to the rod chamber, and inserted with the magnet assembly, and the magnet chamber may include a chamber communication hole which communicates with the rod chamber.

The hydraulic block may further include a sensor seating unit provided on an outer surface adjacent to the magnet chamber, and mounted or disposed with the sensor.

The central axis of the magnet chamber may be parallel to the central axis of the rod chamber, and disposed eccentrically to the sensor seating unit from the central axis of the rod chamber.

The rod assembly may further include a rod housing including a piston through-hole which communicates to a front side from an opening of the rod chamber, and fastened to the front surface of the hydraulic block and closing an opening of the magnet chamber, a first piston fastened to the rear end of the rod, and moving with the same displacement as the displacement of the rod, a plunger fastened to the rear end of the first piston, and moving with the same displacement as the displacement of the first piston, a plunger cap provided between the front end of the plunger and the first piston, and a second piston fastened to the rear end of the plunger, and disposed in the rod chamber.

The rod may include a clevis provided on the front end, and mechanically connected to the brake pedal, a support plate fixedly provided at a rear side of the clevis, a first spring provided between the front surface of the rod housing, and the support plate, and a boot provided between the rod housing and the support plate so that the first spring is disposed therein.

The first piston may include a rod fastening bore into which a part of the rear end of the rod is inserted and fixed, a plunger first fastening bore into which parts of the front ends of the plunger and the plunger cap are inserted and fixed, and a first piston stopper provided on the rear end and limiting a movement range of the first piston.

The first piston may further include a rod fixation bush provided in the rod fastening bore, to which the rear end of the rod is fixed.

The plunger may include a plunger protrusion provided to protrude to the front side on the front surface, and a plurality of plunger grooves recessed on an outer peripheral surface in a longitudinal direction of the plunger.

The plunger cap may include a plunger fastening hole provided on the front surface to fasten the plunger protrusion, a plunger cap flange provided on the rear end, and a plurality of plunger cap protrusions inserted into the plunger groove to surround a part of the front end of the plunger.

The second piston may include a plunger second fastening bore into which a part of the rear end of the plunger is inserted and fixed, a second spring fastening bore into which a part of a second spring disposed to the front side of the rod chamber from the rear end of the rod chamber is inserted and fixed, and a second piston stopper provided on the front end and limiting a movement range of the second piston.

The magnet assembly may include a magnet housing having a cylindrical shape, a magnet fastening unit provided inside the magnet housing and fastened to the magnet, and a mounting unit provided on the front end of the magnet housing, and fixed between the first piston stopper provided on the rear end of the first piston and the plunger cap flange provided on the rear end of the plunger cap.

The magnet may include a first magnet provided at a front side of a gap forming member provided at the center of the magnet fastening unit, and a second magnet provided at the rear side of the gap forming member.

The magnet assembly path may be extended to the rear end of the magnet housing from the front end of the magnet housing via the first magnet, the gap forming member, and the second magnet.

A diameter of the magnet assembly path formed on the front end and the rear end of the magnet housing may be larger than a diameter of the magnet assembly path formed in the first magnet, the gap forming member, and the second magnet.

The magnet assembly may further include a step portion formed on the rear end of the magnet housing, and having a larger diameter than the magnet housing, and a taper portion provided to be inclined downward to the rear end of the magnet housing from the step portion.

The magnet assembly may further include a plurality of mounting protrusions which protrudes at the rear side of the mounting unit.

In the mounting unit, a front surface may be in close contact with the first piston stopper, and a rear surface may be fixed to have a gap from the front surface of the plunger cap flange by the mounting protrusion.

The mounting unit may be formed integrally with the magnet housing.

According to an exemplary embodiment of the present disclosure, an electronic brake system may be provided, which includes: a hydraulic block; a rod assembly including a rod which moves linearly by operation of the brake pedal and having at least a part disposed in the hydraulic block; a magnet assembly including a magnet which moves with the same displacement as a displacement of the rod, and a magnet assembly path penetrating a central axis of the magnet, and disposed in the hydraulic block; and a sensor sensing a magnetic field change of the magnet, and generating an electrical signal corresponding to the displacement of the rod.

According to the exemplary embodiment, as a stroke sensor apparatus for a brake pedal and an electronic brake system including thereof have a simple structure and are easily assembled and installed, spatial efficiency of a vehicle may be enhanced.

According to the exemplary embodiment, as a stroke sensor apparatus for a brake pedal and an electronic brake system including thereof may minimize a distance deviation between a magnet which moves linearly according to a displacement of a brake pedal, and a sensor sensing the magnet, the displacement of the brake pedal may be accurately and effectively detected.

According to the exemplary embodiment, as a stroke sensor apparatus for a brake pedal and an electronic brake system including thereof may prevent a magnet assembly including the magnet which moves linearly according to the displacement of the brake pedal from being deformed or tilted while moving, the displacement of the brake pedal may be more accurately and effectively detected.

The effects of the present disclosure are not limited to the aforementioned effects, and other effects, which are not mentioned above, will be apparently understood to a person having ordinary skill in the art from the following description.

The objects to be achieved by the present disclosure, the means for achieving the objects, and the effects of the present disclosure described above do not specify essential features of the claims, and, thus, the scope of the claims is not limited to the disclosure of the present disclosure.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
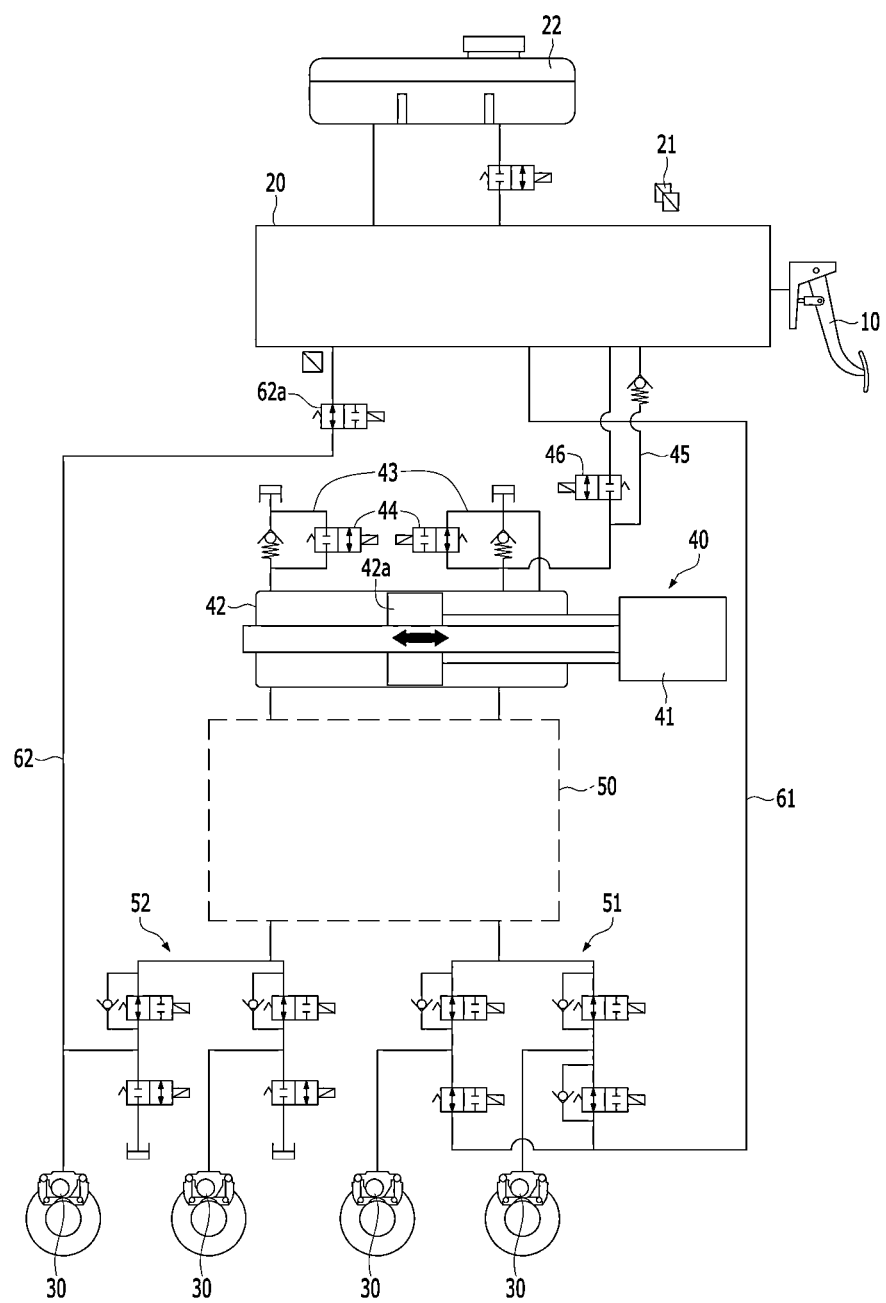
FIG. 1 is a schematic view illustrating an overall configuration of an electronic brake system adopting a stroke sensor apparatus for a brake pedal according to an exemplary embodiment of the present disclosure.

Hereinafter, exemplary embodiments of the present disclosure will be described in detail with reference to the accompanying drawings. The following exemplary embodiment is to present the idea of the present disclosure to those skilled in the art to which the present disclosure pertains. The present disclosure is not limited to exemplary embodiments presented herein and may be embodied in other forms. In the drawings, illustration of parts not related to the description is omitted to clarify the present disclosure, and the size of a component may be slightly exaggerated and expressed to help understanding.

FIG. 1 is a schematic view illustrating an overall configuration of an electronic brake system adopting a stroke sensor apparatus for a brake pedal according to an exemplary embodiment of the present disclosure.

Referring to FIG. 1, an electronic brake system including a stroke sensor apparatus for a brake pedal according to an exemplary embodiment of the present disclosure may include a master cylinder 20 providing a reaction force according to a pedal force of a brake pedal 10 to a driver and at the same time, pressing and ejecting brake oil accommodated therein, a wheel cylinder 30 receiving a liquid pressure of the brake oil and performing braking of respective vehicle wheels RR, RL, FR, and FL, an actuator 40 receiving a braking willingness of the driver as an electrical signal by a pedal displacement sensor 21 sensing a displacement of the brake pedal 10, and generating the liquid pressure of the brake oil through a mechanical operation, a hydraulic control unit 50 controlling the liquid pressure delivered to the wheel cylinder 30, and an electronic control unit (ECU) (not illustrated) controlling an actuator 40 and various valves based on liquid pressure information and pedal displacement information.

Here, the master cylinder 20 as a component adopting stroke sensor apparatuses 100, 200, 300, and 400 for a brake pedal according to an exemplary embodiment of the present disclosure to be described below is provided so that when the driver applies the pedal force to the brake pedal 10 for the braking operation, the brake oil supplied from a reservoir tank 22 and accommodated in the master cylinder 20 is pressed and ejected according to the displacement of the brake pedal 10 sensed by the pedal displacement sensor 21. A specific configuration of the master cylinder 20 will be described in more detail in the stroke sensor apparatus for a brake pedal according to an exemplary embodiment of the present disclosure.

The actuator 40 is a general liquid pressure supply device that receives the braking willingness of the driver from the pedal displacement sensor 21 sensing the displacement of the brake pedal 10 as the electrical signal and generating the liquid pressure of the brake oil through the mechanical operation. To this end, the actuator 40 may include a driving unit 41 which operates by the electrical signal of the pedal displacement sensor 21, and a liquid pressure generation device 42 providing pressure to the brake oil delivered to the wheel cylinder 30 by a motor operation of the driving unit.

The motor of the driving unit 41 is provided to operate a piston 42a of the liquid pressure generation device 42 by the electrical signal output by the electronic control unit. The motor may be provided to include a stator and a rotor, and thus rotates in a forward direction or a reverse direction to provide power that generates a displacement of the piston 42a. A rotational angular velocity and a rotational angle of the motor may be precisely controlled by a motor control sensor. The motor is already widely known technology, so a detailed description will be omitted.

For example, the liquid pressure generation device 42 may include a ball screw nut converting rotational force according to the motor operation of the driving unit 41 into a linear motion, a linear pump pressed by the ball screw nut, and the like. That is, the actuator 40 drives the motor according to the electrical signal of the pedal displacement sensor 21, and moves a piston of the linear pump forward or backward to generate a braking pressure.

Further, the electronic brake system including the stroke sensor apparatus for a brake pedal according to an exemplary embodiment of the present disclosure may include a dump path 43 and a dump valve 44 controlling a flow of a pressing medium between the master cylinder 20 and the actuator 40, and further include an inspection path 45 and an inspection valve 46 inspecting whether leakage occurs.

The hydraulic control unit 50 may include a first hydraulic circuit 51 and a second hydraulic circuit 52 controlling two vehicle wheels, respectively by receiving the liquid pressure from the actuator 40. As an example, the first hydraulic circuit 51 may control a right front wheel FR and a left rear wheel RL, and the second hydraulic circuit 52 may control a left front wheel FL and a right rear wheel RR. The wheel cylinder 30 is installed in each of the vehicle wheels FR, FL, RR, and RL and receives the liquid pressure to achieve braking.

Further, the electronic brake system including the stroke sensor apparatus for a brake pedal according to an exemplary embodiment of the present disclosure may also further include first and second back-up paths 61 and 62 that implement braking by supplying the brake oil ejected from the master cylinder 20 to the wheel cylinder 30 directly by the driver when the actuator 40 does not normally operate.

Braking and braking release operations of the electronic brake system having the structure are known technologies, so a detailed description is omitted.

Figure 2:
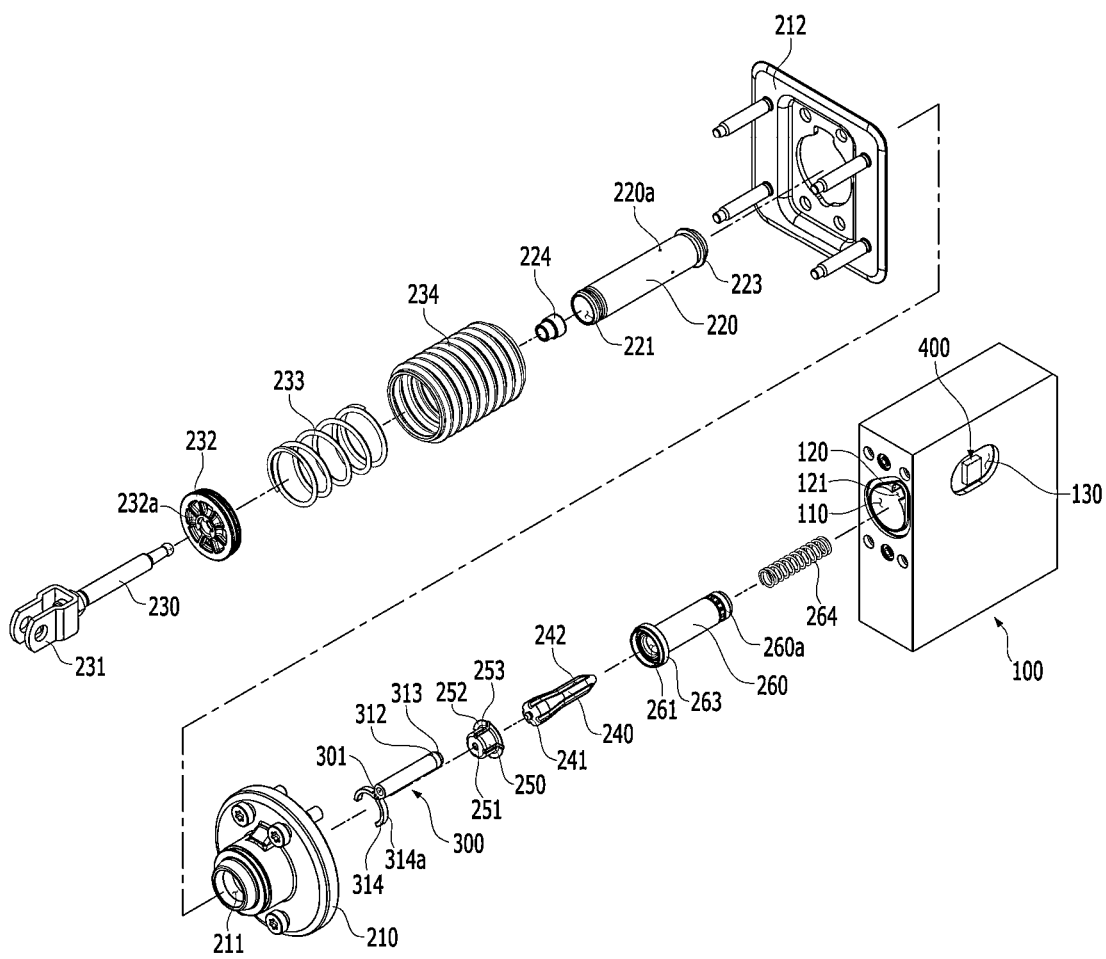
FIG. 2 is an exploded perspective view illustrating a disassembled state of the stroke sensor apparatus for a brake pedal according to an exemplary embodiment of the present disclosure.
Figure 3:
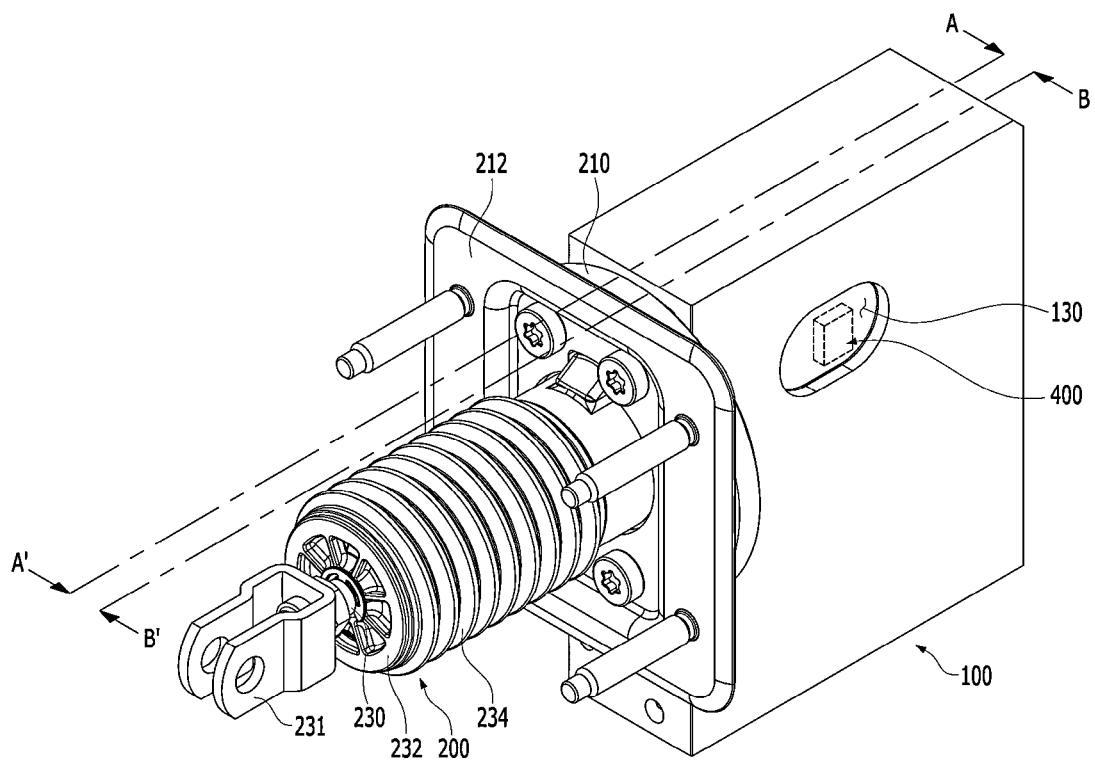
FIG. 3 is a perspective view illustrating an assembled state of the stroke sensor apparatus for a brake pedal according to an exemplary embodiment of the present disclosure.
Figure 4:
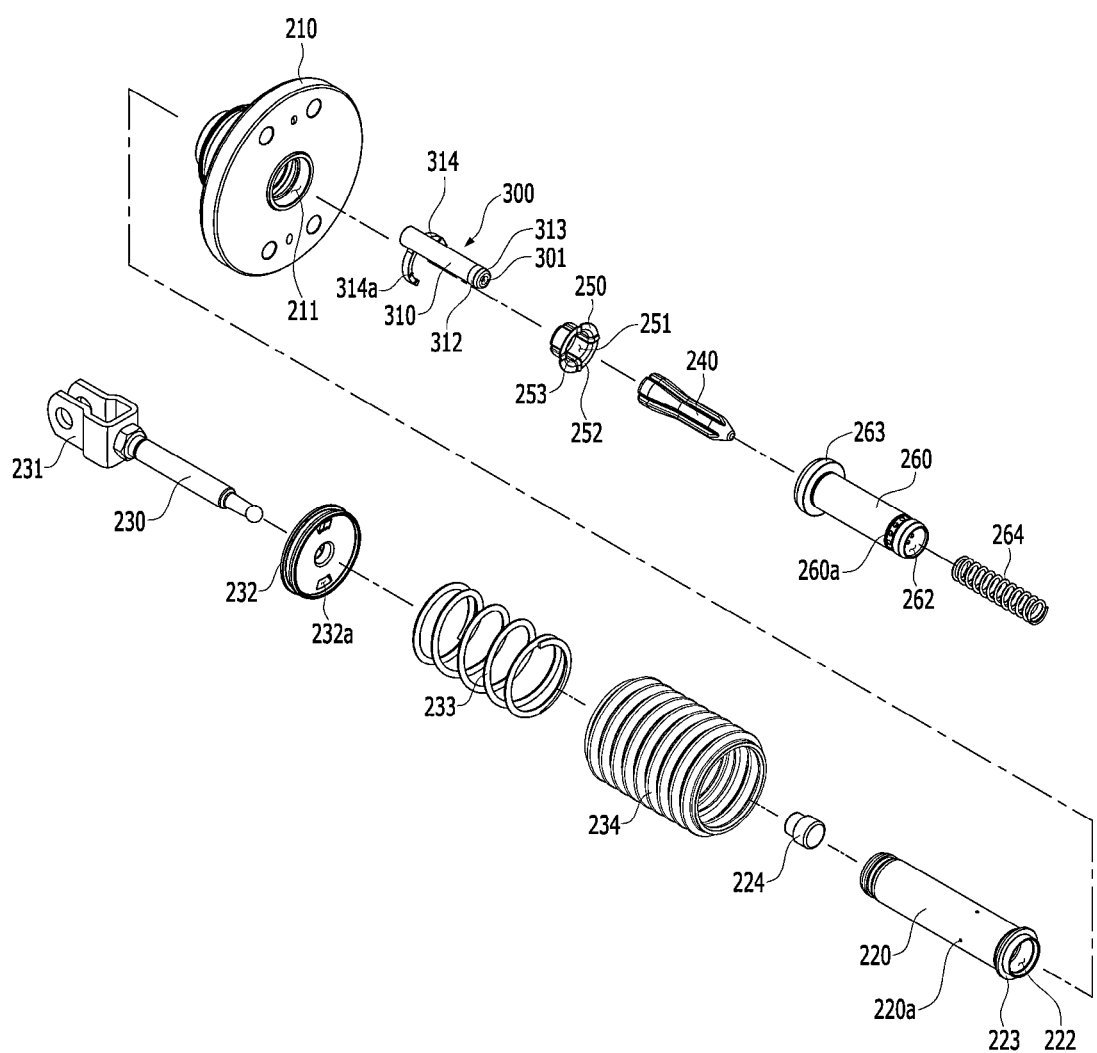
FIG. 4 is an exploded perspective view illustrating a disassembled state of main components of the stroke sensor apparatus for a brake pedal according to an exemplary embodiment of the present disclosure.
Figure 5:
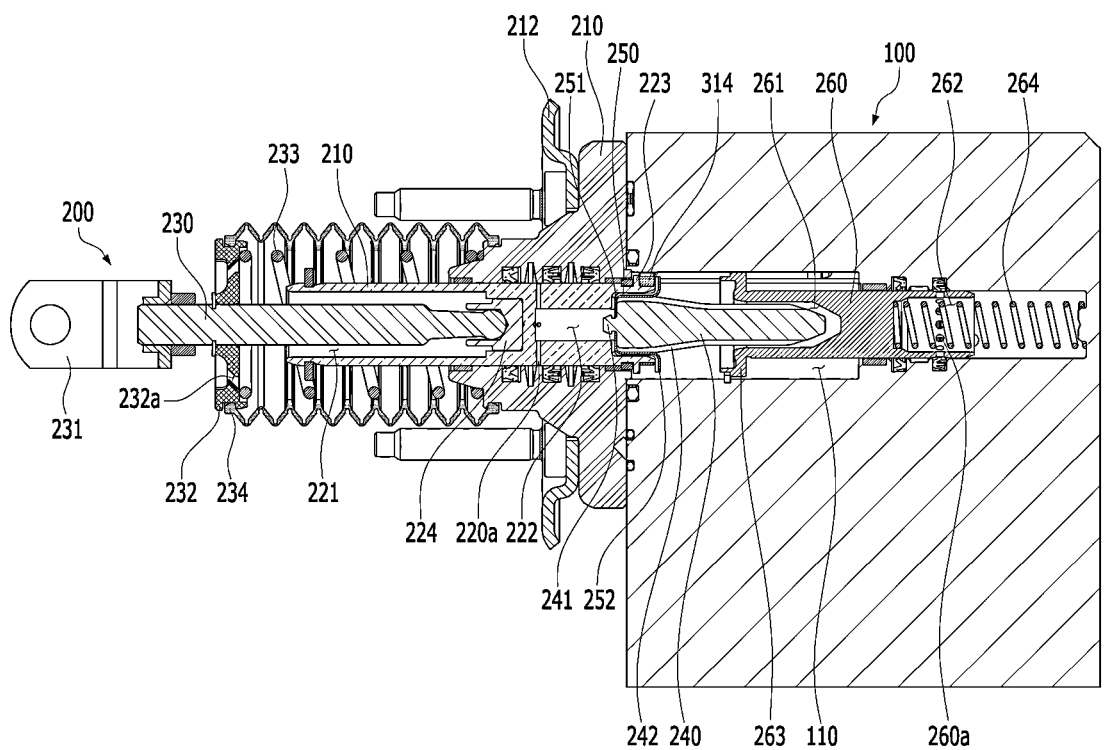
FIG. 5 is a cross-sectional view illustrating cross-section A-A' of FIG. 3.
Figure 6:
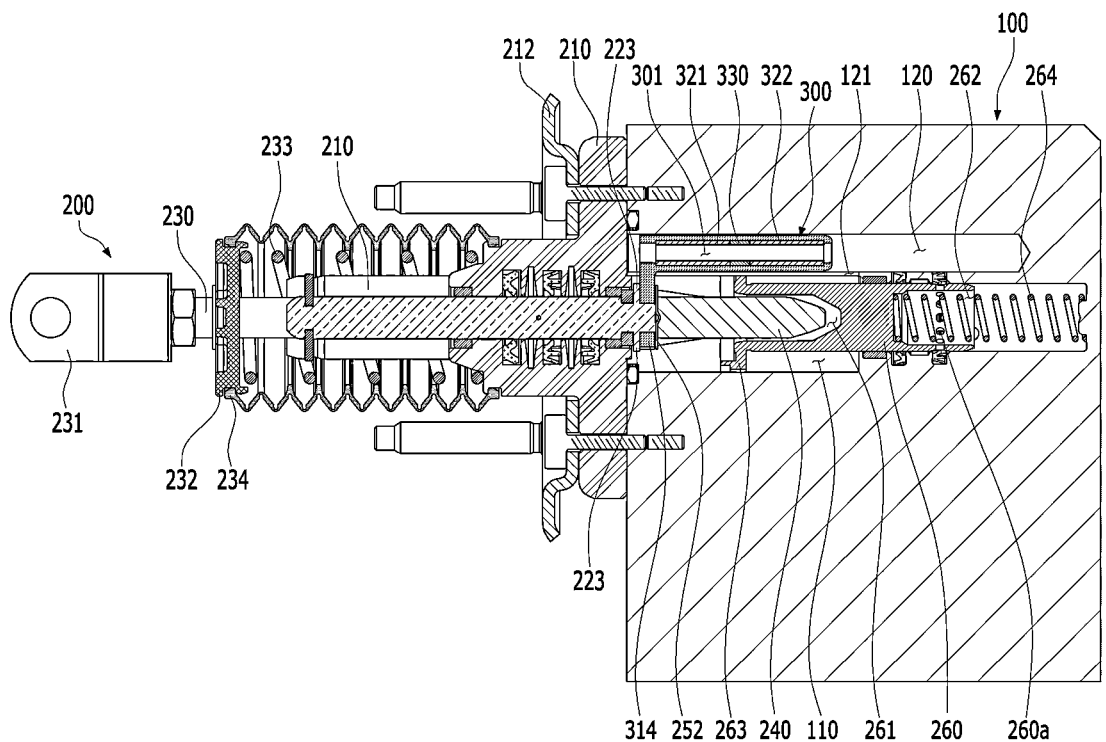
FIG. 6 is a cross-sectional view illustrating cross-section B-B' of FIG. 3.
Figure 7:
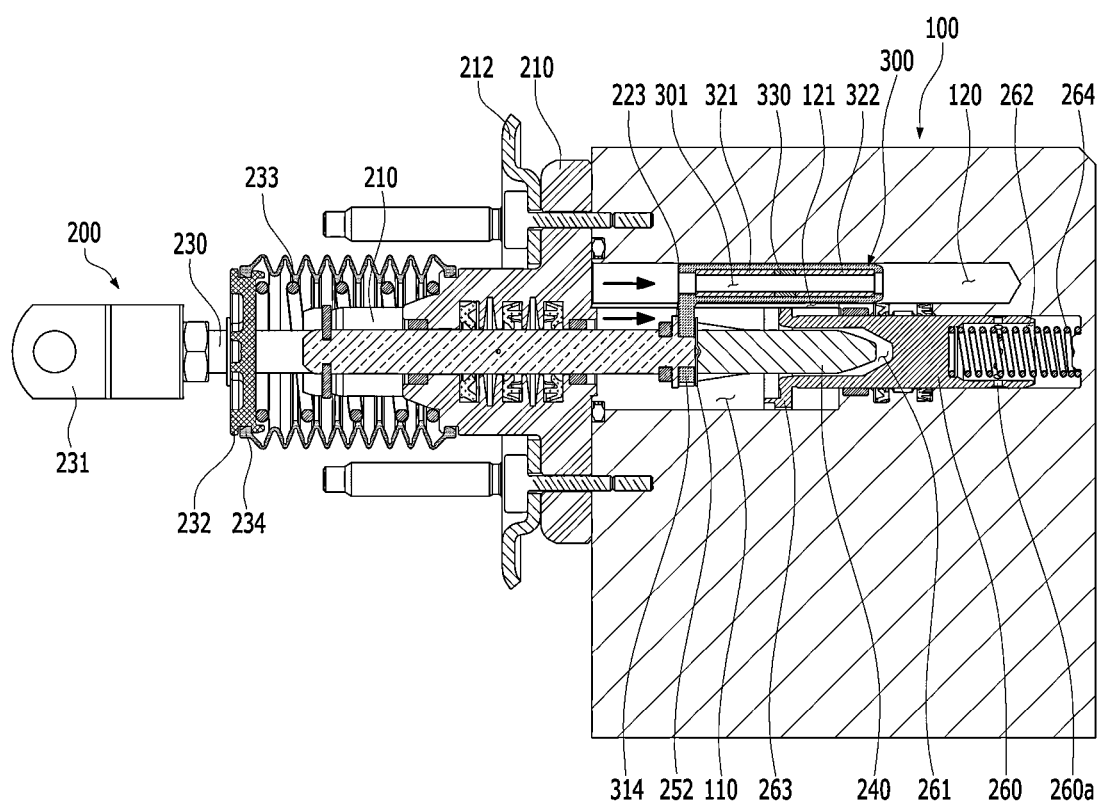
FIG. 7 is a cross-sectional view illustrating a displaced state of a rod assembly and a magnet assembly in FIG. 6.
Figure 8:
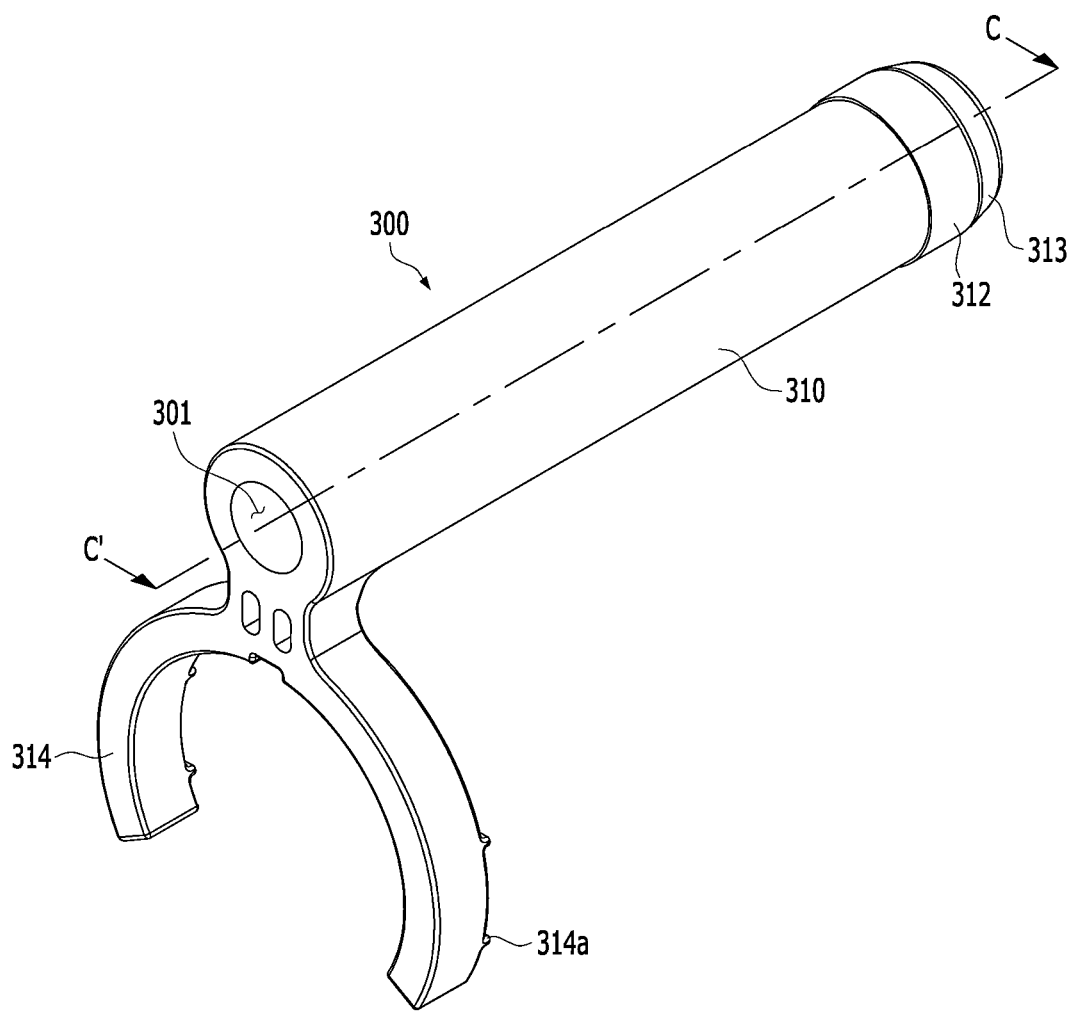
FIG. 8 is a perspective view illustrating the magnet assembly of the stroke sensor apparatus for a brake pedal according to an exemplary embodiment of the present disclosure.
Figure 9:
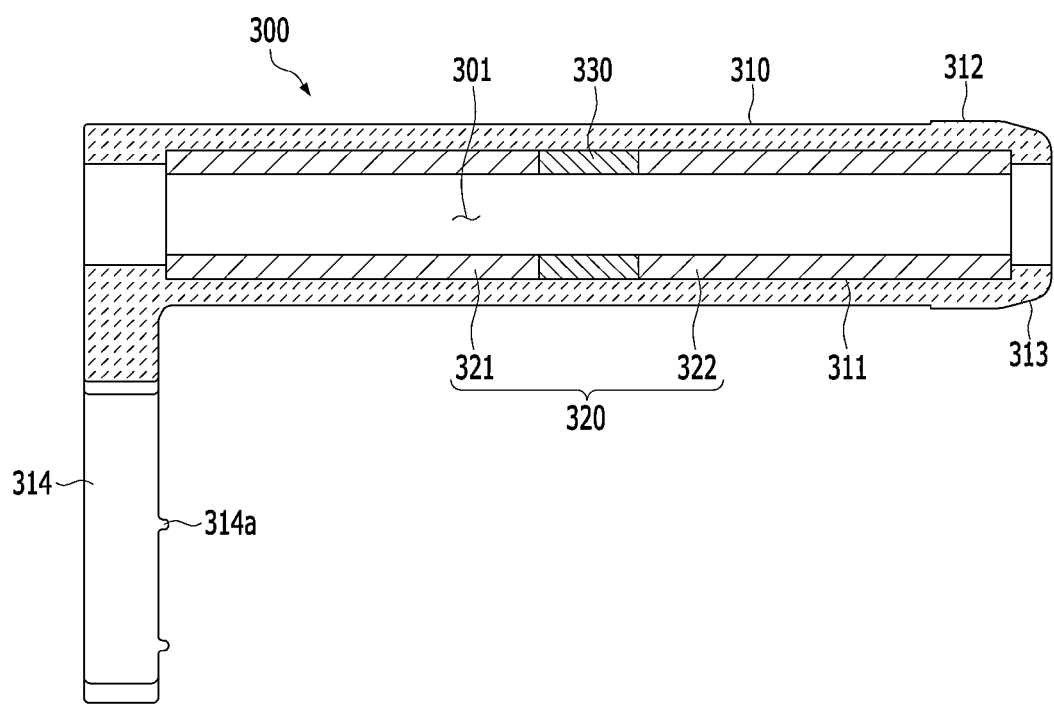
FIG. 9 is a cross-sectional view illustrating cross-section C-C' of FIG. 8.
Figure 10:
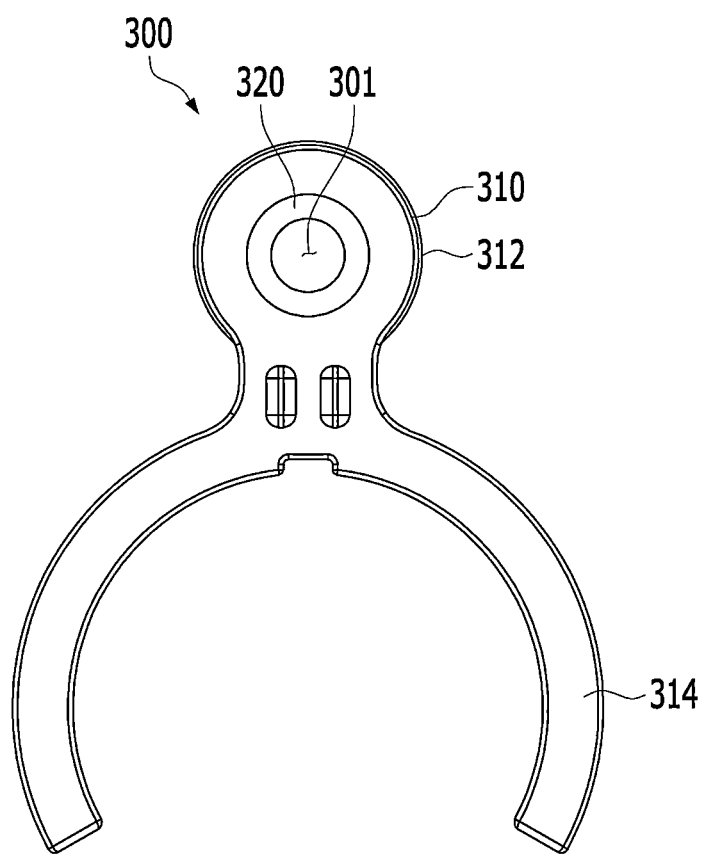
FIG. 10 is a front view illustrating the magnet assembly of the stroke sensor apparatus for a brake pedal according to an exemplary embodiment of the present disclosure.
Figure 11:
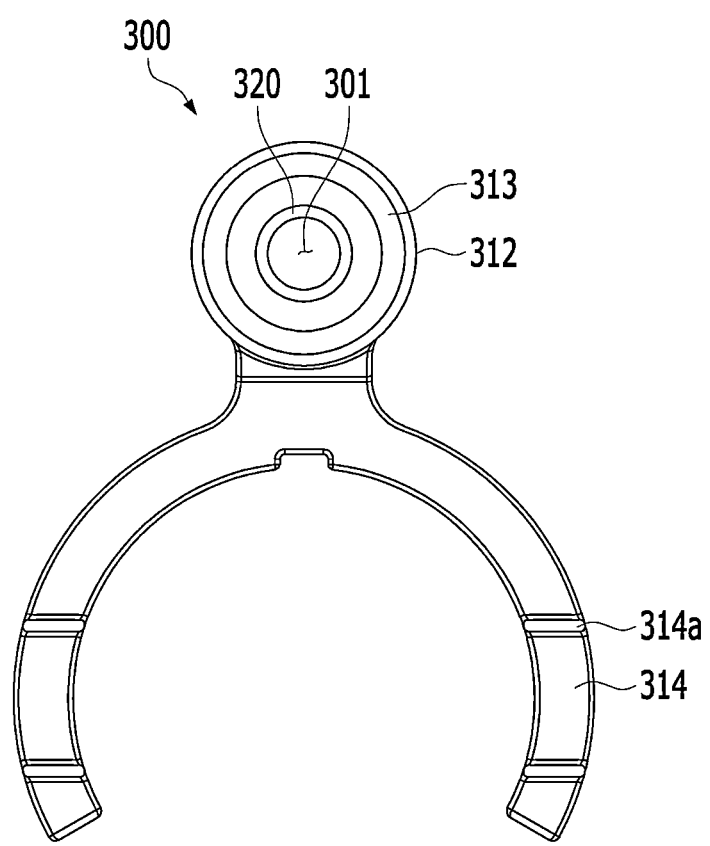
FIG. 11 is a rear view illustrating the magnet assembly of the stroke sensor apparatus for a brake pedal according to an exemplary embodiment of the present disclosure.

Meanwhile, FIGS. 2 and 3 are an exploded perspective view illustrating an disassembled state and a perspective view illustrating an assembled state of the stroke sensor apparatus for a brake pedal according to an exemplary embodiment of the present disclosure. Further, FIG. 4 is an exploded perspective view illustrating a disassembled state of main components of the stroke sensor apparatus for a brake pedal according to an exemplary embodiment of the present disclosure, and FIGS. 5 and 6 are cross-sectional views illustrating cross-section A-A' and cross-section B-B' of FIG. 3, respectively. Further, FIG. 7 is a cross-sectional view illustrating a displaced state of a rod assembly and a magnet assembly in FIG. 6. In addition, FIG. 8 is a perspective view illustrating the magnet assembly of the stroke sensor apparatus for a brake pedal according to an exemplary embodiment of the present disclosure, and FIG. 9 is a cross-sectional view illustrating cross-section C-C' of FIG. 8. Further, FIGS. 10 and 11 are a front view and a rear view illustrating the magnet assembly of the stroke sensor apparatus for a brake pedal according to an exemplary embodiment of the present disclosure, respectively.

Referring to FIGS. 1 to 11, the stroke sensor apparatus for a brake pedal according to an exemplary embodiment of the present disclosure may include a hydraulic block 100, a rod assembly 200 including a rod 230 which moves linearly by operation of the brake pedal 10 and having at least a part disposed in the hydraulic block 100, a magnet assembly 300 including a magnet 320 which moves with the same displacement as a displacement of the rod 230, and disposed in the hydraulic block 100, and a sensor 400 sensing a magnetic field change of the magnet 320, and generating an electrical signal corresponding to the displacement of the rod 230.

The hydraulic block 100 may include a plurality of paths (not illustrated) for receiving the brake oil from the components of the electronic brake system or supplying the brake oil to the components of the electronic brake system, and multiple valves (not illustrated) for adjusting the flow of the brake oil. Further, the hydraulic block 100 may include a rod chamber 110 provided so that at least a part of the rod assembly 200 may be disposed, and a magnet chamber 120 provided so that the magnet assembly 300 may be disposed. In addition, the hydraulic block 100 may include a sensor seating unit 130 which is recessed on an outer surface adjacent to the magnet chamber 120, and mounted or placed with the sensor 400.

Each of the rod chamber 110 and the magnet chamber 120 may be formed as a cylindrical groove overall. Further, a central axis of the magnet chamber 120 may be formed to be parallel to a central axis of the rod chamber 110, and the sensor 400 may be disposed eccentrically to the sensor seating unit 130 from the central axis of the rod chamber 110 to be disposed adjacent to the magnet chamber 120.

Further, lengths of the rod chamber 110 and the magnet chamber 120 from an opening formed on a front surface of the hydraulic block 100 up to a rear side may be formed to be longer than displacements of the rod assembly 200 and the magnet assembly 300 according to the displacement of the brake pedal 100, respectively. More specifically, a volume of the rod chamber 110 is formed to be larger than a volume of the magnet chamber 120, so the rod chamber 110 may serve as a main chamber of the hydraulic block 100.

Further, the hydraulic block 100 may further include a chamber communication hole 121 provided between the magnet chamber 120 and the rod chamber 110 to be in communication with each other. As illustrated in FIG. 6, with respect to the chamber communication hole 121, each of the rod chamber 110 and the magnet chamber 120 may be formed to be longer than a rear end of the magnet assembly 300 when the magnet assembly 300 is disposed at a front side of the magnet chamber 120 from the opening formed on the front surface of the hydraulic block 100.

Further, although not illustrated, the hydraulic block 100 may further include a path which is provided in each of the rod chamber 110 and the magnet chamber 120, and is in communication with the outside of the hydraulic block 100. Further, the hydraulic block 100 is illustrated as a regular hexahedron, but is not limited thereto, and may also be provided in various shapes according to an installation space of the vehicle.

Meanwhile, the rod assembly 200 may include a rod housing 210 fastened to one surface of the opening of the rod chamber 110 and closing the opening of the magnet chamber 120, a first piston 220 fastened to the rear end of the rod 230 and moving with the same displacement as the displacement of the rod 230, a plunger 240 fastened to the rear end of the first piston 220 and moving with the same displacement as the displacement of the first piston 220, a plunger cap 250 between the front end of the plunger 240 and the first piston 220, and a second piston 260 fastened to the rear end of the plunger 240 and disposed in the rod chamber 110.

As illustrated in FIG. 2, the rod housing 210 may include a piston through-hole 211 formed in a circular shape overall when viewed from the front surface, and passes through the center, and a support bracket 212 for fixing the stroke sensor apparatus for a brake pedal according to an exemplary embodiment of the present disclosure to a vehicle body. Here, a central axis of the piston through-hole 211 may be provided on the same straight line as the central axis of the rod chamber 110. As a result, while a part of the rod assembly 200 is embedded in the rod chamber 110, and the remaining part is exposed to the outside of the hydraulic block 100 via the piston through-hole 211, the rod assembly 200 may move linearly according to the displacement of the brake pedal 10.

Further, the rod housing 210 may be formed in a sufficient size to seal the opening of the magnet chamber 120 disposed to be eccentric to the sensor seating unit 120 from the central axis of the rod chamber 110 from the outside as described above. Further, a plurality of sealing members may be provided on a surface where the rod housing 210 and the hydraulic block 10 are in contact with each other. In addition, the rod housing 210 may further include a plurality of fastening members fastened to the hydraulic block 100 from the rod housing 210.

Further, the support bracket 212 may be fastened and fixed to the front surface of the hydraulic block 100 jointly with the rod housing 210 at the front side of the rod housing 210. Further, the support bracket 212 may be made of a metallic material such as a steel for firmly fixing the stroke sensor apparatus for a brake pedal according to an exemplary embodiment of the present disclosure to the vehicle body as described above, and may include a plurality of fastening members.

The first piston 220 may include a rod fastening bore 221 formed in a hollow cylindrical shape overall and extended from the front surface to the rear side, and a plunger first fastening bore 222 extended from the rear surface to the front side. Here, the rod fastening bore 221 and the plunger first fastening bore 222 may be provided not to be in communication with each other.

Further, as illustrated in FIG. 5, the first piston 220 may also further include a first piston radial path 220a which communicates from the inside of the plunger first fastening bore 222 to the rod chamber 110. A plurality of first piston radial paths 220a is provided radially based on the central axis of the first piston 220 to prevent a pressure in the plunger first fastening bore 222 from being formed differently from a pressure in the rod chamber 110 other than the first fastening bore 222 due to accumulation, etc. of the pressing medium such as the brake oil.

Further, the first piston 220 may further include a first piston stopper 223 provided on the rear end and limiting a forward movement range of the first piston 220. Here, the first piston stopper 223 is provided in a flange shape having a diameter larger than an overall diameter of the first piston 220 and caught on the rear surface of the rod housing 210 closely fastened to the front surface of the hydraulic block 100 to prevent the first piston 220 from being separated to the front side of the rod housing 210 through the piston through-hole 211. As a result, the first piston 220 is possible to move linearly forward or backward in the rod housing 210 and the rod chamber 110 within a predetermined range along the piston through-hole 211.

Further, the first piston 220 may further include a rod fixation bush 224 disposed in the rod fastening bore 221 and fastened to the rear end of the rod 230. To this end, as illustrated in FIG. 5, the rod fixation bush 224 may be provided to be seated and fixed onto the rear end of the rod fastening bore 221.

Further, the stroke sensor apparatus for a brake pedal according to an exemplary embodiment of the present disclosure may further include a plurality of sealing members provided between the piston through-hole 211 and the outer peripheral surface of the first piston 220, and preventing the brake oil stored in the hydraulic block 100 from being leaked to the outside of the hydraulic block 100.

The rod 230 may include a clevis 231 provided on the front end and mechanically connected to the brake pedal 10, and a support plate 232 adjacent to the rear side of the clevis 231, and fastened and fixed to the outer peripheral surface of the rod 230, and the rear end of the rod 230 may be inserted and fixed into the rod fastening bore 221 provided in the first piston 220.

Here, the rod 230 fastened to the rod fastening bore 221 may be formed to be partially movable radially based on the central axis of the rod fastening bore 221. As a result, even when force generated by pressing the brake pedal 10 by the driver is applied to the rod 230 in a direction which is not the same as an axial direction of the rod 230, but which is inclined at a predetermined angle, the first piston 220 is movable in the same direction as the axial direction of the rod 230.

Further, the rod 230 may further include a first spring 233 provided between the front surface of the rod housing 210 and the rear surface of the support plate 232, and restoring the rod 230 when the operation of the brake pedal 10 is released, and a boot 234 provided between the front surface of the rod housing 210 and the rear surface of the support plate 232 so that the first spring 233 is disposed in the boot 234.

More specifically, as illustrated in FIG. 2, the support plate 232 may include a bent hole 232a provided to communicate the outside and the inside of the boot 234 for smooth compression and compression release of the boot 234. Here, as illustrated in FIG. 5, as the bent hole 232a is inclined from the front surface to the rear surface of the support plate 232 at a predetermined angle, an external foreign material may be prevented from being introduced into the boot 234 through the bent hole 232a.

As illustrated in FIG. 7, when the driver presses the brake pedal 10, the first spring 233 is compressed, so the rod assembly 200 linearly moves to the rod chamber 110 overall. Further, the boot 234 which is to prevent the foreign materials from being introduced into the first piston 220 exposed to the outside of the rod housing 210 may be compressed when the driver presses the brake pedal 10 similarly to the first spring 233.

On the contrary, as illustrated in FIG. 6, when the driver releases the pressing of the brake pedal 10, the first spring 233 is decompressed, so the rod assembly 200 linearly moves at an opposite side to the rod chamber 110 overall. Further, the boot 234 may be decompressed when the driver releases the pressing of the brake pedal 10 similarly to the first spring 233. To this end, the boot 234 may be made of a material such as rubber which is elastically transformable. Further, as described above, as air inside the boot 234 is smoothly discharged to the outside of the boot 234 through the bent hole 232a provided in the support plate 232, the boot 234 may be smoothly restored.

The plunger 240 may include a plunger protrusion 241 which is formed on the front surface to protrude forward in a cylindrical shape in which a front end-side diameter is larger than a rear end-side diameter overall, and a plurality of plunger grooves 242 provided on the outer peripheral surface in a longitudinal direction of the plunger 240. Here, the plunger groove 242 is not to firmly fix the plunger cap 250, but may also serve as the path of the brake oil. To this end, the plunger groove 242 may be extended long from the front end to the rear end of the plunger 240.

The plunger cap 250 may be provided to surround a part of the front end of the plunger 240, and disposed between the front end of the plunger 240 and the first piston 220. To this end, the plunger cap 250 may include a plunger fastening hole 251 provided on the front surface and fastened to the plunger protrusion 241, a plunger cap flange 252 provided on the rear end, and a plurality of plunger cap protrusions 253 inserted into the plunger groove 242.

More specifically, the plunger cap flange 252 may be disposed to be spaced apart from the rear side of the first piston stopper 223 at a predetermined interval, and the diameter of the plunger cap flange 252 may be formed to be the same as or similar to the diameter of the first piston stopper 223. Further, as illustrated in FIG. 4 the plunger cap protrusion 253 may be formed to protrude on the inner peripheral surface of the plunger cap 250, and extended from the front end of the plunger cap 250 to the plunger cap flange 252. As a result, the plunger cap 250 is fastened to the plunger 240 to be prevented from rotating in an axial direction of the plunger 250.

The second piston 260 may include a plunger second fastening bore 261 which is formed in the hollow cylindrical shape overall, and inserted and fixed with a part of the rear end of the plunger 240 on the front surface, a second spring fastening bore 262 into which a part of the second spring 264 disposed at the front side of the rod chamber 110 is inserted and fixed from the rear end of the rod chamber 110, and a second piston stopper 263 provided at the front end and limiting a movement range of the second piston 260, and may be disposed at the rear side of the rod chamber 110.

Further, as illustrated in FIG. 5, the second piston 260 may also further include a second piston radial path 260a which communicates from the inside of the second spring fastening bore 262 to the rod chamber 110. A plurality of second piston radial paths 260a are provided radially based on the central axis of the second piston 260 to prevent a pressure in the second spring fastening bore 262 from being formed differently from a pressure in the rod chamber 110 other than the second spring fastening bore 262 due to accumulation, etc. of the pressing medium such as the brake oil.

Further, the second piston stopper 263 is provided in a flange shape having a larger diameter than the overall diameter of the second piston 260, and when the second piston 263 moves to the rear side, the second piston stopper 263 is caught on a step portion formed at the rear side of the rod chamber 110 having a smaller diameter than the front side of the rod chamber 110 to prevent the second piston 260 from excessively moving to the rear side of the rod chamber 110. As a result, the second piston 260 is possible to move linearly forward or backward in the rod chamber 110 within a predetermined range.

Further, the rear end of the second spring 264 may be fixed to the rear end of the rod chamber 110, and the front end may be fixed to the inside of the second spring fastening bore 262. Here, the diameter of the second spring 264 is formed to be smaller than the diameter of the second spring fastening bore 262 to prevent the second piston radial path 260a from being closed due to the second spring 264.

The magnet assembly 300 may include a magnet housing 310 having the cylindrical shape, a magnet fastening unit 311 provided inside the magnet housing 310 and fastened to the magnet 320, and a mounting unit 314 provided on the front end of the magnet housing 310, and fixed between the first piston stopper 223 provided on the rear end of the first piston 220 and the plunger cap flange 252 provided on the rear end of the plunger cap 250, and may be disposed inside the magnet chamber 120, and may move with the same displacement as the displacements of the first piston 220 and the plunger 240.

Further, the magnet assembly 300 may include a magnet assembly path 301 penetrating up to the rear surface of the magnet housing 310 from the front surface of the magnet housing 310 through the magnet 320. As a result, the pressing medium such as the brake oil stored in the magnet chamber 120 may be evenly stored in the magnet chamber 120 through the magnet assembly path 301.

More specifically, the magnet housing 310 may further include a step portion 312 formed on the rear end of the magnet housing 310 to have a diameter larger than the diameter of the magnet housing 310, and a taper portion 313 provided to be inclined downward up to the rear end of the magnet housing 310 from the step portion 312. As a result, the magnet assembly 300 may be easily inserted and coupled into the magnet chamber 120 by the taper portion 313.

Further, when the magnet assembly 300 moves forward or backward with the same displacement as the displacements of the first piston 220 and the plunger 240 in the magnet chamber 120 by the step portion 312, the magnet assembly 300 may smoothly move by minimizing a friction between the outer peripheral surface of the magnet housing 310 and the inner peripheral surface of the magnet chamber 120 except for the step portion 312.

Further, the mounting unit 314 fixed between the first piston stopper 223 and the plunger cap flange 252 as described above may be formed integrally with the magnet housing 310 so that the magnet assembly 300 may move forward or backward with the same displacement as the displacements of the first piston 220 and the plunger 240. Further, the magnet housing 310 formed integrally with the mounting unit 314 as described above may be made of a synthetic resin material such as polycarbonate.

Further, as illustrated in FIG. 4, the mounting unit 314 may include a plurality of mounting protrusions 314a which protrudes to the front surface of the plunger cap flange 252 on the rear surface.

Here, the mounting protrusions 314a may be formed at both sides to be symmetric based on a virtual vertical line passing through the central axis of the magnet assembly path 301 so that the mounting unit 314 may be fixed between the first piston stopper 223 and the plunger cap flange 252 while a micro gap is formed with the entire rear surface of the mounting unit 314 being not in close contact with the front surface of the plunger cap flange 252, and at least four mounting protrusions 314a may be provided. As a result, the magnet assembly 300 including the magnet 320 which moves linearly according to the displacement of the brake pedal 10 may be prevented from being deformed or tilted while moving.

Meanwhile, the magnet 320 embedded in the magnet fastening unit 311 may include a first magnet 321 provided at the front side of a gap forming member 330 provided at the center of the magnet fastening unit 311 and a second magnet 322 provided at the rear side of the gap forming member 330. Here, the gap forming member 330 may be made of a material having no magnetism and provided to form a gap between the first magnet 321 and the second magnet 322 so as to more minutely measure an overlap value of magnetic forces or magnetic flux densities generated by the first magnet 321 and the second magnet 322.

Further, the magnet housing 310 may be manufactured by insert injection molding in the magnet fastening unit 311 jointly with the first magnet 321 and the gap forming member 330 without a separation need for coupling the first magnet 321, the gap forming member 330, and the second magnet 322 to the magnet fastening unit 311.

To this end, in order to mold the magnet housing 310 while the first magnet 321, the gap forming member 330, and the second magnet 322 are embedded in the magnet fastening unit 311, the diameter of the magnet assembly path 301 formed on the front end and the rear end of the magnet housing 100 may be provided to be larger than the diameter of the magnet assembly path 301 formed in the first magnet 321, the gap forming member 330, and the second magnet 322.

As a result, the magnet housing 310 may more smoothly move in the magnet chamber 120 as a fastening structure, a parting line, or the like for coupling the first magnet 321, the gap forming member 330, and the second magnet 322 to the magnet fastening unit 311 may be omitted. Further, as the magnet housing 310 and the mounting unit 314 are integrally formed as described above, the magnet assembly 300 is possible to more smoothly move in the magnet chamber 120.

The sensor 400 may be disposed at the sensor mounting unit 130 installed on a printed circuit board (not illustrated) and provided outside the hydraulic block 100 so as to minutely measure the displacement of the first piston 220 and the stroke of the brake pedal 10 by sensing a change in magnetic force or a change in magnetic flux density which occurs while the magnet 320 moves in the magnet chamber 120 jointly with the magnet assembly 300.

At this time, a distance between the sensor seating unit 130 recessed on one surface of the hydraulic block 100 and the magnet 320 which moves linearly in the magnet chamber 120 formed to be adjacent to the sensor seating unit 130 compared to the rod chamber 110 is minimized, so the sensor 400 may more accurately sense the change in magnetic force or the change in magnetic flux density which occurs with the movement of the magnet 320.

Meanwhile, an operation method of the stroke sensor apparatus for the brake pedal according to an exemplary embodiment of the present disclosure configured as described above is described below. Hereinafter, in the stroke sensor apparatus for the brake pedal according to an exemplary embodiment of the present disclosure, a state in which the brake pedal 10 is not pressed is referred to as an initial state, and a state in which the driver steps on the brake pedal 10 and the brake pedal 10 is pressed in order to brake or decelerate the vehicle is referred to as an operation state.

When the initial state of the stroke sensor apparatus for a brake pedal according to an exemplary embodiment of the present disclosure is described with reference to FIGS. 5 and 6, the rod assembly 200 maximally protrudes to the front surface of the hydraulic block 100, and the magnet assembly 300 is disposed at the front side of the magnet chamber 120.

More specifically, in the rod assembly 200, the first piston stopper 223 is supported on the rear surface of the rod housing 210, and the second piston 260 is embedded in the rod chamber 110, and the rear end of the first piston 220 and the front sides of the plunger cap 250 and the plunger 240 are disposed between the front side of the rod chamber 110 and the rear side of the rod through-hole 211. As a result, while the first spring 233, and the boot 234 and the second spring 264 are decompressed, the rod 230 is kept to maximally protrude to the front side of the hydraulic block 100.

Further, as described above, the mounting unit 314 is fixed between the first piston stopper 223 and the plunger cap flange 252, so the magnet assembly 300 is kept to be embedded in the front side of the magnet chamber 120.

At this time, the second piston 260 moves to the front side from the rear end of the rod chamber 110 by the second spring 264, so the second piston stopper 263 is kept to be maximally spaced from the step portion formed at the rear side of the rod chamber 110 having a smaller diameter than the front side of the rod chamber 110 to the front side.

When the operation state of the stroke sensor apparatus for a brake pedal according to an exemplary embodiment of the present disclosure is described with reference to FIG. 7, the rod assembly 200 moves to the rear side of the hydraulic block 100, and the magnet assembly 300 moves to the rear side of the magnet chamber 120 compared to the initial state.

More specifically, in the rod assembly 200, each of the plunger cap 250, and the plunger 240 and the second piston 260 moves to the rear side of the rod chamber 110 jointly with the first piston 220 so that the first piston stopper 223 is spaced apart from the rear surface of the rod housing 210. As a result, the first spring 233, and the boot 234 and the second spring 264 may be compressed, and the rear end of the rod 230 may be inserted into the rod chamber 110.

At this time, the second piston stopper 263 is caught on the step portion formed at the rear side of the rod chamber 110 having a smaller diameter than the front side of the rod chamber 110 to prevent the second piston 260 from excessively moving to the rear side of the rod chamber 110.

Further, as described above, while the mounting unit 314 is fixed between the first piston stopper 223 and the plunger cap flange 252, the magnet assembly 300 moves the rear side of the magnet chamber 120 jointly with the first piston 220, and the plunger cap 250 and the plunger 240. At this time, as the first magnet 321, and the gap forming member 330 and the second magnet 322 are subjected to be insert injection molding jointly with the magnet fastening unit 311 in the magnet housing 310 as described above, the fastening structure, parting line, or the like for coupling the first magnet 321, and the gap forming member 330 and the second magnet 322 to the magnet fastening unit 311 is omitted, so the friction with the magnet chamber 120 is minimized, thereby more smoothly moving the magnet assembly 300.

At this time, the sensor 400 senses the change in magnetic force or magnetic flux density of the magnet 320 which moves backward in the magnet chamber 120 as described above to sense the displacement of the first piston 220 which moves with the same displacement as the displacement of the brake pedal 10. Further, the distance between the sensor seating unit 130 recessed on one surface of the hydraulic block 100 and the magnet 320 which moves linearly in the magnet chamber 120 formed to be adjacent to the sensor seating unit 130 compared to the rod chamber 110 is minimized, so the sensor 400 may more accurately sense the change in magnetic force or the change in magnetic flux density which occurs with the movement of the magnet 320.

Meanwhile, when the driver releases the pressing of the brake pedal 10 in the operation state as described, the stroke sensor apparatus for a brake pedal is restored to the initial state again, and the first spring 233, and the boot 234 and the second spring 264 are decompressed, and the second piston 260, the plunger 240, the plunger cap 250, the first piston 220, and the rod 230 move forward.

Further, as described above, while the mounting unit 314 is fixed between the first piston stopper 223 and the plunger cap flange 252, the magnet assembly 300 moves to the front side of the magnet chamber 120 jointly with the rod assembly 200.

At this time, the sensor 400 senses the change in magnetic force or magnetic flux density of the magnet 320 which moves forward in the magnet chamber 120 as described above to sense the displacement of the first piston 220 which moves with the same displacement as the displacement of the brake pedal 10.

As a result, according to the exemplary embodiment, as the stroke sensor apparatus for a brake pedal and the electronic brake system including thereof may minimize the distance deviation between the magnet which moves linearly according to the displacement of the brake pedal and the sensor sensing the magnet, and prevent the magnet assembly including the magnet which moves linearly according to the displacement of the brake pedal from being deformed or tilted while moving, the displacement of the brake pedal may be more accurately and effectively detected.

The specific exemplary embodiments for the stroke sensor apparatus for a brake pedal according to the present disclosure are described, but it is apparent that various modifications can be made within the limit without departing from the scope of the present disclosure.

Therefore, the scope of the present disclosure should not be limited and defined to the exemplary embodiments and should be defined by not only the appended claims but also equivalents to the appended claims.

That is, the exemplary embodiments described as above are exemplary in all aspects and should be understood as not being restrictive and the scope of the present disclosure is represented by claims to be described below rather than the detailed description, and it is to be interpreted that the meaning and scope of the claims and all the changes or modified forms derived from the equivalents thereof come within the scope of the present disclosure.

What is claimed is:

1. A stroke sensor apparatus for a brake pedal, comprising:
   a hydraulic block;
   a rod assembly including a rod which moves linearly by operation of the brake pedal and having at least a part disposed in the hydraulic block;
   a magnet assembly including a magnet which moves with the same displacement as a displacement of the rod; and
   a sensor sensing a magnetic field change of the magnet, and generating an electrical signal corresponding to the displacement of the rod,
   wherein the magnet assembly includes a magnet assembly path penetrating a central axis of the magnet, and is disposed in the hydraulic block, and
   wherein the magnet assembly path is penetrated up to a rear surface of a magnet housing from a front surface of the magnet housing through the magnet.

2. The stroke sensor apparatus for a brake pedal according to claim 1, wherein the hydraulic block includes
   a rod chamber into which a rear end of the rod assembly is inserted, and
   a magnet chamber provided to be adjacent to the rod chamber, and inserted with the magnet assembly, and the magnet chamber includes a chamber communication hole which communicates with the rod chamber.

3. The stroke sensor apparatus for a brake pedal according to claim 2, wherein the rod assembly further includes
a rod housing including a piston through-hole which communicates to a front side from an opening of the rod chamber, and fastened to a front surface of the hydraulic block and closing an opening of the magnet chamber,
a first piston fastened to a rear end of the rod, and moving with the same displacement as the displacement of the rod,
a plunger fastened to a rear end of the first piston, and moving with the same displacement as a displacement of the first piston,
a plunger cap provided between a front end of the plunger and the first piston, and
a second piston fastened to a rear end of the plunger, and disposed in the rod chamber.

4. The stroke sensor apparatus for a brake pedal according to claim 3, wherein the rod includes
a clevis provided on a front end, and mechanically connected to the brake pedal,
a support plate fixedly provided at a rear side of the clevis,
a first spring provided between a front surface of the rod housing, and the support plate, and
a boot provided between the rod housing and the support plate so that the first spring is disposed therein.

5. The stroke sensor apparatus for a brake pedal according to claim 3, wherein the first piston includes
a rod fastening bore into which a part of the rear end of the rod is inserted and fixed,
a plunger first fastening bore into which parts of the front ends of the plunger and the plunger cap are inserted and fixed, and
a first piston stopper provided on a rear end and limiting a movement range of the first piston.

6. The stroke sensor apparatus for a brake pedal according to claim 5, wherein the first piston further includes a rod fixation bush provided in the rod fastening bore, to which the rear end of the rod is fixed.

7. The stroke sensor apparatus for a brake pedal according to claim 3, wherein the plunger includes
a plunger protrusion provided to protrude to a front side on a front surface, and
a plurality of plunger grooves recessed on an outer peripheral surface in a longitudinal direction of the plunger.

8. The stroke sensor apparatus for a brake pedal according to claim 7, wherein the plunger cap includes
a plunger fastening hole provided on a front surface to fasten the plunger protrusion,
a plunger cap flange provided on a rear end, and
a plurality of plunger cap protrusions inserted into the plunger groove to surround a part of the front end of the plunger.

9. The stroke sensor apparatus for a brake pedal according to claim 3, wherein the second piston includes
a plunger second fastening bore into which a part of the rear end of the plunger is inserted and fixed,
a second spring fastening bore into which a part of a second spring disposed to the front side of the rod chamber from a rear end of the rod chamber is inserted and fixed, and
a second piston stopper provided on a front end and limiting a movement range of the second piston.

10. A stroke sensor apparatus for a brake pedal, comprising:
a hydraulic block;
a rod assembly including a rod which moves linearly by operation of the brake pedal and having at least a part disposed in the hydraulic block;
a magnet assembly including a magnet which moves with the same displacement as a displacement of the rod, and a magnet assembly path penetrating a central axis of the magnet, wherein the magnet assembly is disposed in the hydraulic block; and
a sensor sensing a magnetic field change of the magnet, and generating an electrical signal corresponding to the displacement of the rod,
wherein the hydraulic block includes:
a rod chamber into which a rear end of the rod assembly is inserted;
a magnet chamber provided to be adjacent to the rod chamber, and inserted with the magnet assembly, wherein the magnet chamber includes a chamber communication hole which communicates with the rod chamber; and
a sensor seating unit having a recessed shape on an outer surface of the hydraulic block, adjacent to the magnet chamber, and mounted or disposed with the sensor.

11. The stroke sensor apparatus for a brake pedal according to claim 10, wherein a central axis of the magnet chamber is parallel to a central axis of the rod chamber, and disposed eccentrically to the sensor seating unit from the central axis of the rod chamber.

12. A stroke sensor apparatus for a brake pedal, comprising:
a hydraulic block;
a rod assembly including a rod which moves linearly by operation of the brake pedal and having at least a part disposed in the hydraulic block;
a magnet assembly including a magnet which moves with the same displacement as a displacement of the rod, and a magnet assembly path penetrating a central axis of the magnet, wherein the magnet assembly is disposed in the hydraulic block; and
a sensor sensing a magnetic field change of the magnet, and generating an electrical signal corresponding to the displacement of the rod;
wherein the hydraulic block includes:
a rod chamber into which a rear end of the rod assembly is inserted; and
a magnet chamber provided to be adjacent to the rod chamber, and inserted with the magnet assembly, wherein the magnet chamber includes a chamber communication hole which communicates with the rod chamber, and
wherein the rod assembly further includes:
a rod housing including a piston through-hole which communicates to a front side from an opening of the rod chamber, and fastened to a front surface of the hydraulic block and closing an opening of the magnet chamber;
a first piston fastened to a rear end of the rod, and moving with the same displacement as the displacement of the rod;
a plunger fastened to a rear end of the first piston, and moving with the same displacement as a displacement of the first piston;
a plunger cap provided between a front end of the plunger and the first piston; and a second piston fastened to a rear end of the plunger, and disposed in the rod chamber, wherein the magnet assembly further includes a magnet housing having a cylindrical shape, a magnet fastening unit covering an outer surface of the magnet and provided inside the magnet housing and fastened to the magnet, and a mounting unit having a ring-shaped structure with one side open and provided on a front end of the magnet housing, and fixed between a first piston stopper provided on the rear end of the first piston and a plunger cap flange provided on a rear end of the plunger cap.

13. The stroke sensor apparatus for a brake pedal according to claim 12, wherein the magnet includes a first magnet provided at a front side of a gap forming member provided at a center of the magnet fastening unit, and a second magnet provided a rear side of the gap forming member, and wherein the gap forming member is protruded from the magnet fastening unit.

14. The stroke sensor apparatus for a brake pedal according to claim 13, wherein the magnet assembly path is extended to a rear end of the magnet housing from the front end of the magnet housing via the first magnet, the gap forming member, and the second magnet.

15. The stroke sensor apparatus for a brake pedal according to claim 13, wherein a diameter of the magnet assembly path formed on the front end and a rear end of the magnet housing is larger than a diameter of the magnet assembly path formed in the first magnet, the gap forming member, and the second magnet.

16. The stroke sensor apparatus for a brake pedal according to claim 13, wherein the magnet assembly further includes a step portion formed on a rear end of the magnet housing, and having a larger diameter than the magnet housing, and a taper portion provided to be inclined downward to the rear end of the magnet housing from the step portion.

17. The stroke sensor apparatus for a brake pedal according to claim 13, wherein the magnet assembly further includes a plurality of mounting protrusions which protrudes at a rear side of the mounting unit.

18. The stroke sensor apparatus for a brake pedal according to claim 17, wherein in the mounting unit, a front surface is in close contact with the first piston stopper, and a rear surface is fixed to have a gap from a front surface of the plunger cap flange by the mounting protrusion.

19. The stroke sensor apparatus for a brake pedal according to claim 13, wherein the mounting unit is formed integrally with the magnet housing.

* * * * *